United States Patent
Mathew et al.

(10) Patent No.: US 9,129,651 B2
(45) Date of Patent: Sep. 8, 2015

(54) ARRAY-READER BASED MAGNETIC RECORDING SYSTEMS WITH QUADRATURE AMPLITUDE MODULATION

(71) Applicant: LSI Corporation, San Jose, CA (US)

(72) Inventors: George Mathew, San Jose, CA (US); Angelo R. Mastrocola, West Lawn, PA (US); Robert A. Greene, Fort Collins, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/048,897

(22) Filed: Oct. 8, 2013

(65) Prior Publication Data

US 2015/0062730 A1 Mar. 5, 2015

Related U.S. Application Data

(60) Provisional application No. 61/872,161, filed on Aug. 30, 2013.

(51) Int. Cl.
| | |
|---|---|
| G11B 5/02 | (2006.01) |
| G11B 20/06 | (2006.01) |
| G11B 20/08 | (2006.01) |
| G11B 5/09 | (2006.01) |
| G11B 20/10 | (2006.01) |

(52) U.S. Cl.
CPC .... *G11B 20/10268* (2013.01); *G11B 20/10009* (2013.01); *G11B 20/10018* (2013.01); *G11B 20/10046* (2013.01)

(58) Field of Classification Search
None
See application file for complete search history.

(56) References Cited

U.S. PATENT DOCUMENTS

| | | |
|---|---|---|
| 3,940,694 A | 2/1976 | Price et al. |
| 5,062,007 A | 10/1991 | Nakatsu et al. |
| 5,278,703 A | 1/1994 | Rub et al. |
| 5,278,846 A | 1/1994 | Okayama |
| 5,317,472 A | 5/1994 | Schweitzer, III |
| 5,325,402 A | 6/1994 | Ushirokawa |
| 5,392,299 A | 2/1995 | Rhines |
| 5,417,500 A | 5/1995 | Martinie |
| 5,513,192 A | 4/1996 | Janku |
| 5,523,903 A | 6/1996 | Hetzler |
| 5,550,810 A | 8/1996 | Monogioudis et al. |
| 5,550,870 A | 8/1996 | Blaker |
| 5,612,964 A | 3/1997 | Haraszti |
| 5,710,784 A | 1/1998 | Kindred |

(Continued)

OTHER PUBLICATIONS

Axvig et al., "Average Min-Sum Decoding of LDPC Codes", 5th International Symposium on Turbo Codes and Related Topics (2008).

(Continued)

*Primary Examiner* — Regina N Holder
(74) *Attorney, Agent, or Firm* — Hamilton DeSanctis & Cha

(57) ABSTRACT

A magnetic recording system includes an array of analog inputs operable to receive analog signals retrieved from a magnetic storage medium, a quadrature amplitude modulator operable to combine the analog signals to yield a quadrature amplitude modulated signal, a quadrature amplitude demodulator operable to yield a plurality of demodulated signals from the quadrature amplitude modulated signal corresponding to each channel of the array, and a joint equalizer operable to filter the plurality of demodulated signals to yield an equalized output.

20 Claims, 4 Drawing Sheets

(56) References Cited

U.S. PATENT DOCUMENTS

| | | | |
|---|---|---|---|
| 5,717,706 A | 2/1998 | Ikeda | |
| 5,802,118 A | 9/1998 | Bliss | |
| 5,818,653 A | 10/1998 | Park et al. | |
| 5,844,945 A | 12/1998 | Nam | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,742 A * | 12/1999 | Cunningham et al. | 360/78.05 |
| 6,005,897 A | 12/1999 | Mccallister | |
| 6,023,783 A | 2/2000 | Divsalar | |
| 6,029,264 A | 2/2000 | Kobayashi | |
| 6,065,149 A | 5/2000 | Yamanaka | |
| 6,097,764 A | 8/2000 | McCallister | |
| 6,145,110 A | 11/2000 | Khayrallah | |
| 6,216,249 B1 | 4/2001 | Bliss | |
| 6,216,251 B1 | 4/2001 | McGinn | |
| 6,266,795 B1 | 7/2001 | Wei | |
| 6,317,472 B1 | 11/2001 | Choi | |
| 6,351,832 B1 | 2/2002 | Wei | |
| 6,377,610 B1 | 4/2002 | Hagenauer | |
| 6,381,726 B1 | 4/2002 | Weng | |
| 6,473,878 B1 | 10/2002 | Wei | |
| 6,535,553 B1 | 3/2003 | Limberg et al. | |
| 6,625,775 B1 | 9/2003 | Kim | |
| 6,748,034 B2 | 6/2004 | Hattori | |
| 6,757,862 B1 | 6/2004 | Marianetti, II | |
| 6,785,863 B2 | 8/2004 | Blankenship | |
| 6,810,502 B2 | 10/2004 | Eidson | |
| 6,970,511 B1 | 11/2005 | Barnette | |
| 6,986,098 B2 | 1/2006 | Poeppelman | |
| 7,047,474 B2 | 5/2006 | Rhee | |
| 7,058,873 B2 | 6/2006 | Song | |
| 7,073,118 B2 | 7/2006 | Greenberg | |
| 7,093,179 B2 | 8/2006 | Shea | |
| 7,117,427 B2 | 10/2006 | Ophir | |
| 7,133,228 B2 | 11/2006 | Fung | |
| 7,184,486 B1 | 2/2007 | Wu | |
| 7,191,378 B2 | 3/2007 | Eroz | |
| 7,203,887 B2 | 4/2007 | Eroz | |
| 7,308,061 B1 | 12/2007 | Huang | |
| 7,310,768 B2 | 12/2007 | Eidson | |
| 7,313,750 B1 | 12/2007 | Feng | |
| 7,349,493 B2 * | 3/2008 | Rudkin | 375/322 |
| 7,370,258 B2 | 5/2008 | Iancu | |
| 7,415,651 B2 | 8/2008 | Argon | |
| 7,502,189 B2 | 3/2009 | Sawaguchi | |
| 7,523,375 B2 | 4/2009 | Spencer | |
| 7,587,657 B2 | 9/2009 | Haratsch | |
| 7,590,168 B2 | 9/2009 | Raghavan | |
| 7,646,829 B2 | 1/2010 | Ashley | |
| 7,702,986 B2 | 4/2010 | Bjerke | |
| 7,752,523 B1 | 7/2010 | Chaichanavong | |
| 7,779,325 B2 | 8/2010 | Song | |
| 7,802,172 B2 | 9/2010 | Casado | |
| 7,952,824 B2 | 5/2011 | Dziak | |
| 7,958,425 B2 | 6/2011 | Chugg | |
| 7,996,746 B2 | 8/2011 | Livshitz | |
| 8,018,360 B2 | 9/2011 | Nayak | |
| 8,201,051 B2 | 6/2012 | Tan | |
| 8,237,597 B2 | 8/2012 | Liu | |
| 8,261,171 B2 | 9/2012 | Annampedu | |
| 8,291,284 B2 | 10/2012 | Savin | |
| 8,295,001 B2 | 10/2012 | Liu | |
| 8,566,666 B2 | 10/2013 | Wang | |
| 2004/0037202 A1 | 2/2004 | Brommer et al. | |
| 2007/0185947 A1 * | 8/2007 | Yoshitake et al. | 708/271 |
| 2008/0069373 A1 | 3/2008 | Jiang | |
| 2008/0304558 A1 | 12/2008 | Zhu et al. | |
| 2009/0132893 A1 | 5/2009 | Miyazaki | |
| 2009/0185643 A1 | 7/2009 | Fitzpatrick | |
| 2011/0167227 A1 | 7/2011 | Yang | |
| 2011/0194571 A1 * | 8/2011 | Ozluturk et al. | 370/479 |
| 2011/0228422 A1 * | 9/2011 | Buckholdt et al. | 360/75 |
| 2011/0264987 A1 | 10/2011 | Li | |
| 2012/0124118 A1 | 5/2012 | Ivkovic | |
| 2012/0182643 A1 | 7/2012 | Zhang | |
| 2012/0207201 A1 | 8/2012 | Xia | |
| 2012/0212849 A1 | 8/2012 | Xu | |
| 2012/0262814 A1 | 10/2012 | Li | |
| 2012/0265488 A1 | 10/2012 | Sun | |
| 2013/0286502 A1 | 10/2013 | Erden et al. | |
| 2014/0154991 A1 * | 6/2014 | Brown et al. | 455/42 |
| 2015/0029608 A1 * | 1/2015 | Mathew et al. | 360/30 |

OTHER PUBLICATIONS

Bahl et al., "Optimal decoding of linear codes for minimizing symbol error rate", IEEE Trans. Inform. Theory, vol. 20, pp. 284-287 (Mar. 1974).

Blaum, "High-Rate Modulation Codes for Reverse Concatenation", IEEE Transactions on Magnetics, vol. 43, No. 2 (Feb. 2007).

Casado et al., Multiple-rate low-density parity-check codes with constant blocklength, IEEE Transations on communications, Jan. 2009, vol. 57, pp. 75-83.

Cui et al., "High-Throughput Layered LDPC Decoding Architecture", IEEE Transactions on Very Large Scale Integration (VLSI) Systems, vol. 17, No. 4 (Apr. 2009).

Fair et al., "Guided scrambling: a new line coding technique for high bit rate fiber optic transmission systems", IEEE Trans. Commun., vol. 39, pp. 289-297 (Feb. 1991).

Fan et al., "Constrained coding techniques for soft iterative decoders" Proc. IEEE Global Telecommun. Conf., vol. 1b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Jin et al., "Design Techniques for Weakly Constrained Codes", IEEE Trans Commun. vol. 51, No. 5, pp. 709-714 (May 2003).

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. 1 Jan. 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Shokrollahi "LDPC Codes: An Introduction", Digital Fountain, Inc. (Apr. 2, 2003).

Spagnol et al, "Hardware Implementation of GF($2^m$) LDPC Decoders", IEEE Transactions on Circuits and Systemsŝi: Regular Papers, vol. 56, No. 12 (Dec. 2009).

Tehrani et al., "Fully Parallel Stochastic LDPC Decoders", IEEE Transactions on Signal Processing, vol. 56, No. 11 (Nov. 2008).

(56) References Cited

OTHER PUBLICATIONS

Todd et al., "Enforcing maximum-transition-run code constraints and low-density parity check decoding", IEEE Trans. Magn., vol. 40, No. 6, pp. 3566-3571 (Nov. 2004).
U.S. Appl. No. 13/283,549, filed Oct. 27, 2011, Wu Chang, Unpublished.
U.S. Appl. No. 13/300,078, filed Nov. 18, 2011, Chung-Li Wang, Unpublished.
U.S. Appl. No. 13/302,119, filed Nov. 22, 2011, Lei Chen, Unpublished.
U.S. Appl. No. 14/031,990, filed Sep. 19, 2013, George Mathew, Unpublished.
U.S. Appl No. 13/269,852, filed Oct. 10, 2011, Haitao Xia, Unpublished.
U.S. Appl. No. 13/284,767, filed Oct. 28, 2011, Fan Zhang, Unpublished.
U.S. Appl. No. 13/269,832, filed Oct. 10, 2011, Haitao Xia, Unpublished.
U.S. Appl. No. 13/227,544, filed Sep. 8, 2011, Shaohua Yang, Unpublished.
U.S. Appl. No. 13/239,683, filed Sep. 22, 2011, Changyou Xu, Unpublished.
U.S. Appl. No. 13/213,751, filed Aug. 19, 2011, Fan Zhang, Unpublished.
U.S. Appl. No. 13/305,551, filed Nov. 28, 2011, Yang Han, Unpublished.
U.S. Appl. No. 13/227,416, filed Sep. 7, 2011, Lei Chen, Unpublished.
U.S. Appl. No. 13/296,022, filed Nov. 14, 2011, Victor Krachkovsky, Unpublished.
U.S. Appl. No. 13/174,537, filed Jun. 30, 2011, Anantha Raman Krishnan, Unpublished.
U.S. Appl. No. 13/174,453, filed Jun. 30, 2011, Johnson Yen, Unpublished.
U.S. Appl. No. 13/171,615, filed Jun. 29, 2011, Bradley D. Seago, Unpublished.
U.S. Appl. No. 13/113,219, filed May 23, 2011, Yang Han, Unpublished.
U.S. Appl. No. 13/295,150, filed Nov. 14, 2011, Zongwang Li, Unpublished.
U.S. Appl. No. 13/186,234, filed Jul. 19, 2011, Haitao Xia, Unpublished.
U.S. Appl. No. 13/873,224, filed Apr. 30, 2013, Razmik Karabed, Unpublished.
U.S. Appl. No. 13/619,907, filed Sep. 14, 2012, Fan Zhang, Unpublished.
U.S. Appl. No. 13/305,510, filed Nov. 28, 2011, Lei Chen, Unpublished.
U.S. Appl. No. 13/597,026, filed Aug. 28, 2012, Fan Zhang, Unpublished.
U.S. Appl. No. 13/284,730, filed Oct. 28, 2011, Fan Zhang, Unpublished.
U.S. Appl. No. 13/622,294, filed Sep. 18, 2012, Fan Zhang, Unpublished.
U.S. Appl. No. 13/670,393, filed Nov. 6, 2012, Lei Chen, Unpublished.
U.S. Appl. No. 13/777,841, filed Feb. 26, 2013, Shu Li, Unpublished.
U.S. Appl. No. 13/777,976, filed Feb. 26, 2013, Shu Li, Unpublished.
U.S. Appl. No. 13/597,001, filed Aug. 28, 2012, Fan Zhang, Unpublished.
U.S. Appl. No. 13/741,003, filed Jan. 14, 2013, Lu Lu, Unpublished.
U.S. Appl. No. 13/621,341, filed Sep. 17, 2012, Shaohua Yang, Unpublished.
U.S. Appl. No. 13/875,951, filed May 2, 2013, Mikhail I Grinchuk, Unpublished.
U.S. Appl. No. 13/742,340, filed Jan. 15, 2013, Razmik Karabed, Unpublished.
U.S. Appl. No. 13/886,103, filed May 2, 2013, Chung-Li Wang, Unpublished.
U.S. Appl. No. 13/898,685, filed May 21, 2013, Dan Liu, Unpublished.
U.S. Appl. No. 13/912,079, filed Jun. 6, 2013, Zongwang Li, Unpublished.
U.S. Appl. No. 13/947,768, filed Jul. 22, 2013, Johnson Yen, Unpublished.
U.S. Appl. No. 14/021,811, filed Sep. 9, 2013, George Mathew, Unpublished.
U.S. Appl. No. 14/015,126, filed Aug. 30, 2013, Lu Pan, Unpublished.
U.S. Appl. No. 13/777,381, filed Feb. 26, 2013, Shaohua Yang, Unpublished.
U.S. Appl. No. 13/327,279, filed Dec. 15, 2011, Wei Feng, Unpublished.
U.S. Appl. No. 13/372,580, filed Feb. 14, 2012, Fan Zhang, Unpublished.
U.S. Appl. No. 13/422,986, filed Mar. 16, 2012, Fan Zhang, Unpublished.
U.S. Appl. No. 13/433,693, filed Mar. 29, 2012, Fan Zhang, Unpublished.
U.S. Appl. No. 13/989,583, filed Oct. 15, 2012, Shaohua Yang, Unpublished.
U.S. Appl. No. 13/412,520, filed Mar. 5, 2012, Fan Zhang, Unpublished.
U.S. Appl. No. 13/596,978, filed Aug. 28, 2012, Fan Zhang, Unpublished.
U.S. Appl. No. 13/445,848, filed Apr. 12, 2012, Bruce A. Wilson, Unpublished.
U.S. Appl. No. 13/362,409, filed Jan. 31, 2012, Fan Zhang, Unpublished.
U.S. Appl. No. 13/426,714, filed Mar. 22, 2012, Shaohua Yang, Unpublished.
U.S. Appl. No. 13/316,741, filed Dec. 12, 2011, Yang Han, Unpublished.
U.S. Appl. No. 13/445,878, filed Apr. 12, 2012, Yu Liao, Unpublished.
U.S. Appl. No. 13/340,974, filed Dec. 30, 2011, Dan Liu, Unpublished.
U.S. Appl. No. 13/340,951, filed Dec. 30, 2011, Lei Chen, Unpublished.
U.S. Appl. No. 13/474,660, filed May 17, 2012, Zongwang Li, Unpublished.
U.S. Appl. No. 13/363,751, filed Feb. 1, 2012, Lei Chen, Unpublished.
U.S. Appl. No. 13/445,834, filed Apr. 12, 2012, Chung-Li Wang, Unpublished.
U.S. Appl. No. 13/545,833, filed Jul. 10, 2012, Zhi Bin Li, Unpublished.
U.S. Appl. No. 13/596,819, filed Aug. 28, 2012, Shaohua Yang, Unpublished.
U.S. Appl. No. 13/369,468, filed Feb. 9, 2012, Zongwang Li, Unpublished.
U.S. Appl. No. 13/596,947, filed Aug. 28, 2012, Fan Zhang, Unpublished.
U.S. Appl. No. 13/316,858, filed Dec. 12, 2011, Zongwang Li, Unpublished.
Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. On Information Theory, vol. 57, No. 10 (Oct. 2011).
Zhong et al., "Design of VLSI Implementation-Oriented LDPC Codes", IEEE, pp. 670-673, 2003.

(56) References Cited

OTHER PUBLICATIONS

Zhong et al., "High-Rate Quasi-Cyclic LDPC Codes for Magnetic Recording Channel with Low Error Floor", ISCAS, IEEE pp. 3546-3549, May 2006.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 7.

Zhong, "Block-LDPC: A Practical LDPC Coding System Design Approach", IEEE Trans. On Circuits, Regular Papers, vol. 5, No. 4, pp. 766-775, Apr. 2005.

Extended European search report dated Jan. 9, 2015.

\* cited by examiner

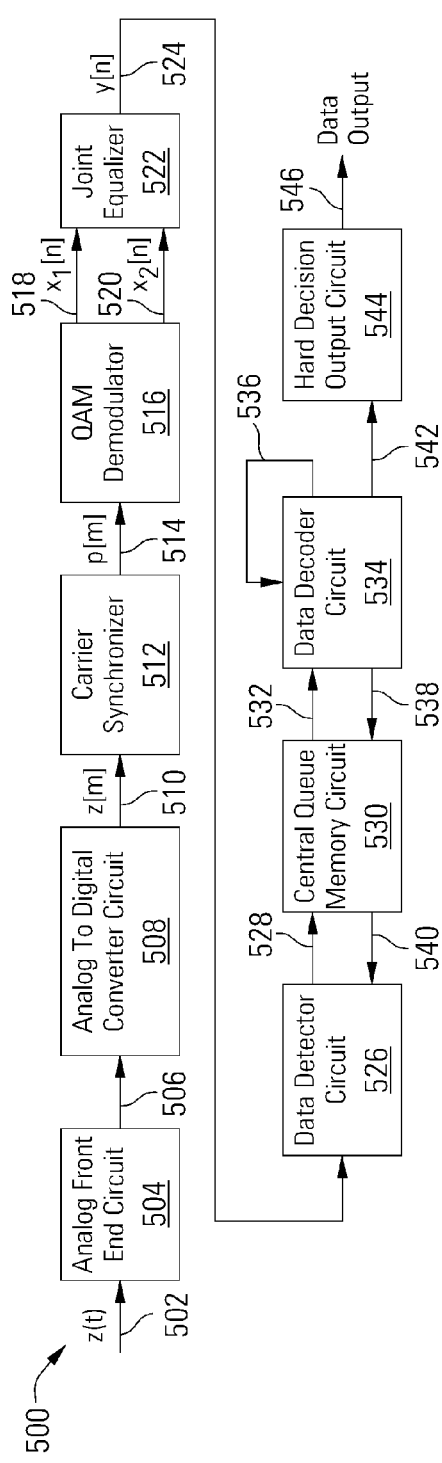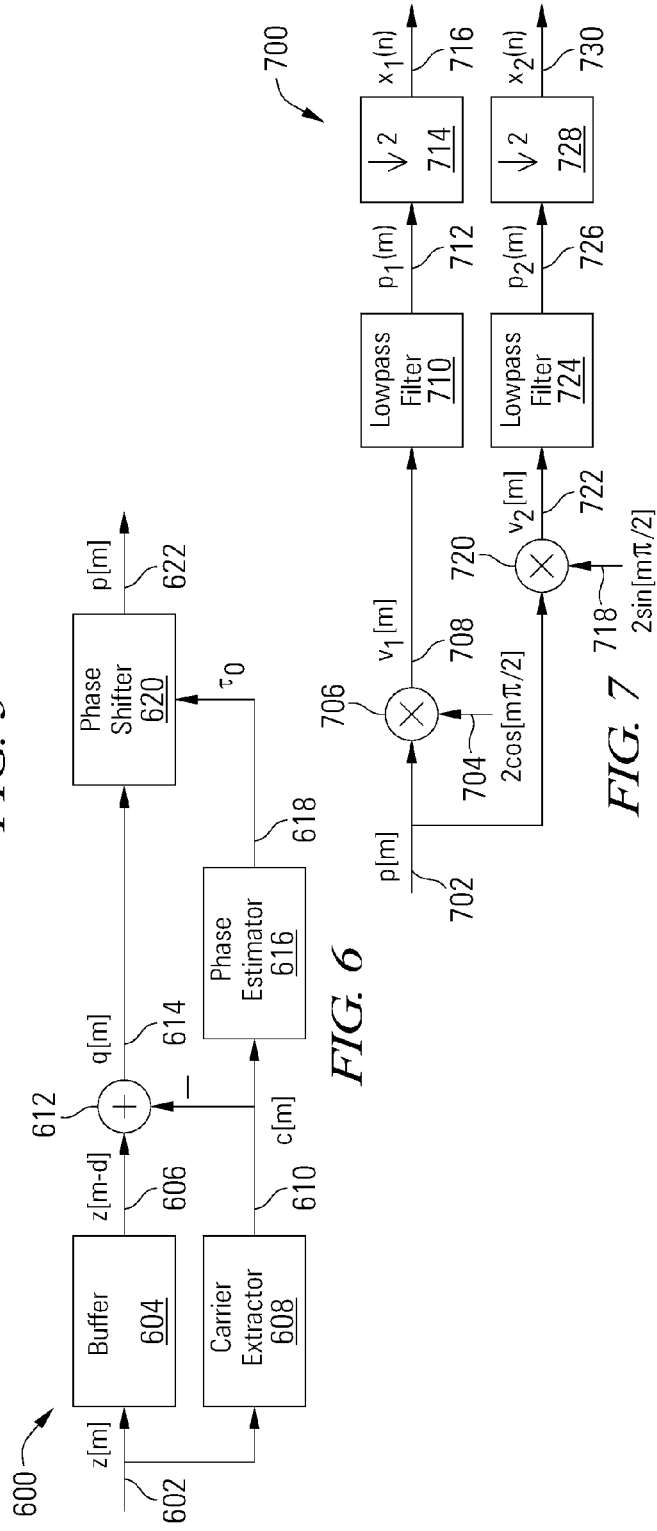

ARRAY-READER BASED MAGNETIC RECORDING SYSTEMS WITH QUADRATURE AMPLITUDE MODULATION

CROSS REFERENCE TO RELATED APPLICATIONS

The present application claims priority to (is a non-provisional of) U.S. Pat. App. No. 61/872,161, entitled "Array-Reader Based Magnetic Recording Systems With Quadrature Amplitude Modulation", and filed Aug. 30, 2013 by Mathew et al, the entirety of which is incorporated herein by reference for all purposes.

FIELD OF THE INVENTION

Various embodiments of the present invention provide systems and methods for processing data, and more particularly to systems and methods for multiplexing signals from an array-reader in a magnetic recording system.

BACKGROUND

In a typical magnetic storage system, digital data is stored in a series of concentric circular tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

BRIEF SUMMARY

Some embodiments of the present invention provide a magnetic recording system having an array of analog inputs operable to receive analog signals retrieved from a magnetic storage medium, a quadrature amplitude modulator operable to combine the analog signals to yield a quadrature amplitude modulated signal, a quadrature amplitude demodulator operable to yield a plurality of demodulated signals from the quadrature amplitude modulated signal corresponding to each channel of the array, and a joint equalizer operable to filter the plurality of demodulated signals to yield an equalized output.

This summary provides only a general outline of some embodiments according to the present invention. Many other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 5 depicts a read channel with quadrature amplitude demodulator in accordance with some embodiments of the present invention;

FIG. 6 depicts a carrier synchronizer in accordance with some embodiments of the present invention;

FIG. 7 depicts a quadrature amplitude demodulator in accordance with some embodiments of the present invention.

DETAILED DESCRIPTION OF THE INVENTION

Embodiments of the present invention are related to systems and methods for multiplexing signals from an array-reader in a magnetic recording system using quadrature amplitude modulation (QAM). In an array-reader, an array of read heads are provided, yielding multiple data streams. The multiple data streams can be used in some embodiments to improve noise compensation, for example reducing inter-track interference by reading a data track at a number of offsets from the track center, or to increase throughput by reading data bits written on multiple tracks. In some embodiments, the array-reader simultaneously reads a particular data track with multiple read heads at different locations. The data is processed first by a preamplifier connected to a read/write head, then by a read channel including circuits such as, but not limited to, analog front end, analog to digital converter, equalizer, and data detector circuits. Because the read heads are moved over a storage medium in the magnetic recording system, the preamplifier is connected to the read channel by a flexible cable or flex cable. Each channel of the array-reader output is processed by a separate analog front-end circuit in the read channel, performing functions such as, but not limited to, amplification, biasing, and filtering. The data is recovered by applying a data detection algorithm to a jointly equalized version of the outputs of the array-reader, where the joint equalizer is a multi-input single output filter or multi-input multi-output filter. With two read heads in the array, the read channel includes two analog front-end circuits in the read channel, which would require two pairs of flex cables to deliver the signals from the preamplifier to the read channel without the combination of array-reader signals using quadrature amplitude modulation disclosed herein.

In some embodiments, the array-reader based magnetic storage system with quadrature amplitude modulation combines the two channels of signals into one channel with two times the bandwidth inside the preamplifier, thereby saving flex cables and analog circuitry. The storage system uses one pair of flex cables to deliver the signals from the preamplifier to the read channel. In some embodiments, the read channel includes one high bandwidth analog front end and one high speed analog to digital converter. In some embodiments, demodulation is performed in the analog domain, and the read channel includes two normal speed analog to digital converters. In some embodiments, quadrature amplitude modulation is used to reduce the number of flex cables, while still including more than one pair of flex cables.

Figure 1:
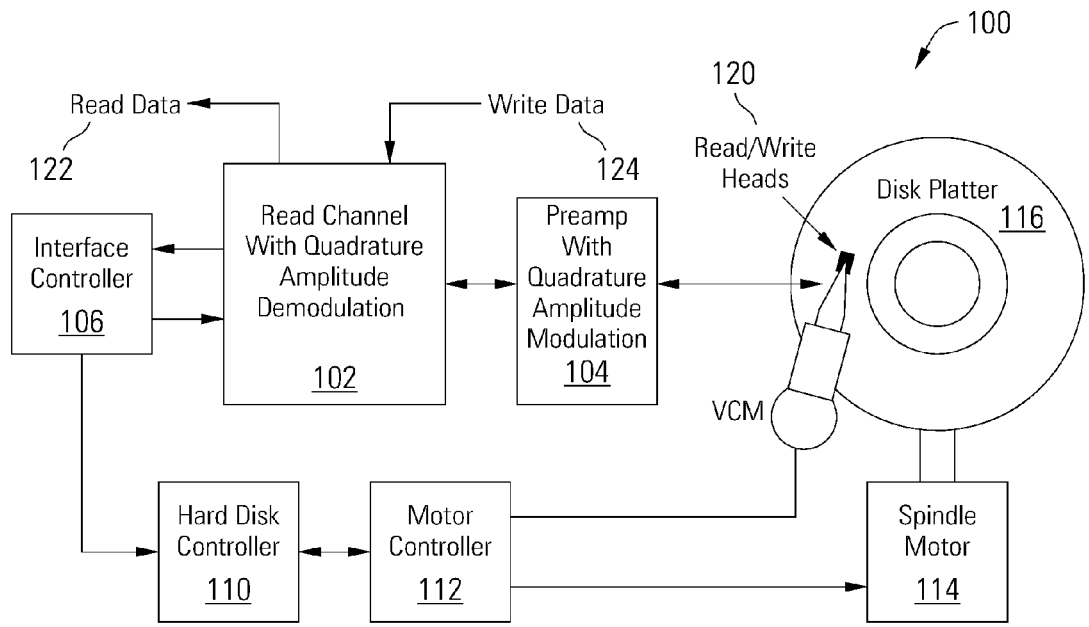
FIG. 1 depicts a magnetic storage system including an array-reader with quadrature amplitude modulation and demodulation in accordance with some embodiments of the present invention.

Turning to FIG. 1, an array-reader based magnetic storage system 100 with quadrature amplitude modulation and demodulation is depicted in accordance with some embodiments of the present invention. The storage system 100 includes a read channel circuit 102 with quadrature amplitude demodulation. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120 with an array-reader. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by an array-reader in read/write head assembly 120 as disk platter 116 is rotated by spindle motor 114. The sensed magnetic signals are provided as continuous, minute analog signals representative of the magnetic data on disk platter 116. These minute analog signals are processed by preamplifiers 104 in the read/write head assembly and combined using quadrature amplitude modulation, then transferred from read/write head assembly 120 to read channel circuit 102 via flex cables. Preamplifier 104 is operable to amplify the minute analog signals accessed from disk platter 116 for each of the two channels. In turn, read channel circuit 102 demodulates, digitizes and decodes the received analog signal to recreate the information originally written to disk platter 116. This data is provided as read data 122 to a receiving circuit. The signal combining using quadrature amplitude modulation can be implemented consistent with the disclosure below in relation to FIGS. 2-7. In some embodiments, the data processing is performed consistent with the flow diagram disclosed below in relation to FIG. 8.

Figure 2:
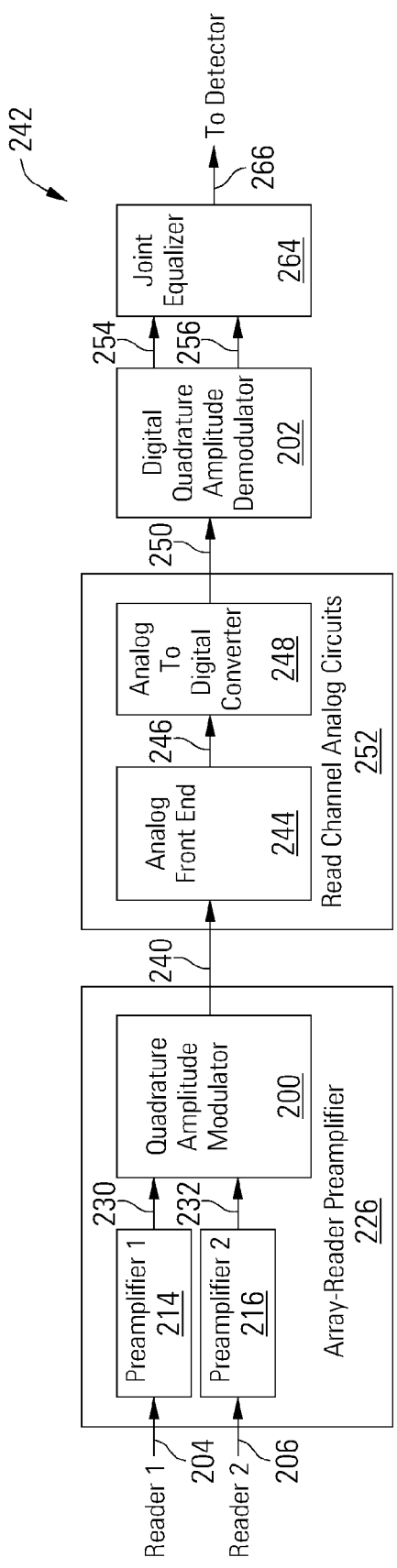
FIG. 2 depicts an array reader magnetic recording system with quadrature amplitude modulation and digital demodulator in accordance with some embodiments of the present invention.

Turning to FIG. 2, an array reader magnetic recording system with quadrature amplitude modulator 200 and digital quadrature amplitude demodulator 202 is depicted in accordance with some embodiments of the present invention. A pair of analog inputs 204, 206 from an array-reader with two read heads are provided to preamplifiers 214, 216 in an array-reader preamplifier 226, yielding amplified analog signals 230, 232. In some embodiments, each of the preamplifiers 214, 216 are adapted to the characteristics of its associated analog input 204, 206 and the reader in the array-reader from which the analog input is obtained. Each of the two channels has a bandwidth of B Hz each, and each of the preamplifiers 214, 216 has a bandwidth of at least B Hz. The preamplifiers 214, 216 may be any circuit known in the art or that may be developed in the future that is capable of amplifying analog signals. Based upon the disclosure provided herein, one of ordinary skill in the art will recognize a variety of amplifier circuits that may be used in relation to different embodiments of the present invention.

Amplified analog signals 230, 232 from preamplifiers 214, 216 are provided to the quadrature amplitude modulator 200 in the array-reader preamplifier 226. In some embodiments, the quadrature amplitude modulator 200 combines the two channels into one channel by quadrature amplitude modulation of a carrier signal by the two channels. In some embodiments, a sinusoidal carrier signal is amplitude modulated by the signal from one reader, a 90 degree phase-shifted version of the carrier signal is amplitude modulated by the signal from the other reader, and the modulated output is combined in a quadrature amplitude modulated signal 240. In some embodiments, the carrier signal is also combined in the quadrature amplitude modulated signal, providing the demodulator with carrier phase information.

The resulting quadrature amplitude modulated signal 240 has a bandwidth of 2B Hz, where B is the bandwidth of a single channel from the array-reader. The quadrature amplitude modulated signal 240 is transmitted to a read channel 242 on flex cables (or any other suitable connection). The quadrature amplitude modulated signal 240 is processed in an analog front end circuit 244, an analog circuit with a bandwidth of at least 2B Hz. The analog front end circuit 244 performs functions such as, but not limited to, amplification, biasing, and filtering of the analog signal 240, yielding processed analog signal 246. The analog front end circuit 244 may be any circuit known in the art for processing an analog signal prior to sampling and further processing such as equalization and value detection. Based upon the disclosure provided herein, one of ordinary skill in the art will recognize a variety of analog front end circuits that may be used in relation to different embodiments of the present invention.

The processed analog signal 246 is provided to an analog to digital converter (ADC) 248 which samples the processed analog signal 246 to yield a stream of digital data samples 250. The analog to digital converter 248 has a bandwidth of at least about 2B Hz with a sampling rate at least twice that required for one channel. For example, in some embodiments, the sampling rate for a single channel would be 2B samples/sec, and the analog to digital converter 248 has a sampling rate of 4B samples/sec to support the two combined channels. Analog to digital converter 248 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. The analog circuits 252 in read channel 242 thus are high speed, high bandwidth analog circuits adapted to process the 2-channel quadrature amplitude modulated signal 240.

The data samples 250 are provided to a digital quadrature amplitude demodulator 202 which operates to separate the signal for data samples 250 into two individual data channels 254, 256, each with a rate of 2B samples/sec, each corresponding with one of the analog inputs 204, 206. The two data channels 254, 256 are provided to a joint equalizer 264, which equalizes or filters the two data channels 254, 256. In some embodiments, the joint equalizer 264 applies digital finite impulse response filtering to the two data channels 254, 256 to yield equalized data samples 266 for the data track based on the two data channels 254, 256. The joint equalizer 264 thus increases the signal to noise ratio for the data track based on the information in the multiple channels from the array-reader. Based upon the disclosure provided herein, one of ordinary skill in the art will recognize a variety of equalizer circuits that may be used in relation to different embodiments of the present invention. The equalized data samples 266 may be subsequently processed in any suitable manner, such as in a Viterbi algorithm detector or a maximum a posteriori detector to identify the values in the equalized data samples 266. If the array-reader is configured such that the signals 204, 206 are coming from the readback of two tracks on the medium 116, the joint equalizer 264 can be configured to result in two output signal streams to facilitate detection of data bits from two tracks on the medium 116.

Figure 3:
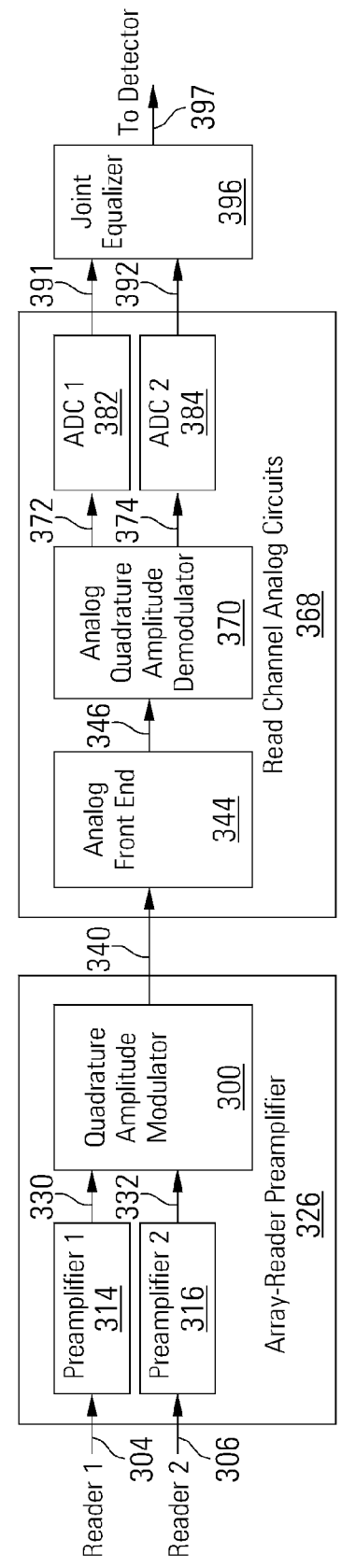
FIG. 3 depicts an array reader magnetic recording system with quadrature amplitude modulation and analog demodulator in accordance with some embodiments of the present invention.

Turning to FIG. 3, an array reader magnetic recording system with quadrature amplitude modulator 300 and analog quadrature amplitude demodulator 370 in accordance with some embodiments of the present invention. In this embodiment, the analog quadrature amplitude demodulator 370 performs the demodulation in the analog circuits 368 of the read channel 398, and two analog to digital converters 382, 384 are provided, each with a sampling rate of 2B and a bandwidth at least high enough to support the demodulated signals.

The two analog inputs 304, 306 from an array-reader are provided to preamplifiers 314, 316 in an array-reader preamplifier 326, yielding amplified analog signals 330, 332. In some embodiments, each of the preamplifiers 314, 316 are adapted to the characteristics of its associated analog input 304, 306 and the reader in the array-reader from which the analog input is obtained. Each of the two channels has a bandwidth of B Hz each, and each of the preamplifiers 314, 316 has a bandwidth of at least B Hz. The preamplifiers 314, 316 may be any circuit known in the art or that may be developed in the future that is capable of amplifying analog signals. Based upon the disclosure provided herein, one of ordinary skill in the art will recognize a variety of amplifier circuits that may be used in relation to different embodiments of the present invention.

Amplified analog signals 330, 332 from preamplifiers 314, 316 are provided to the quadrature amplitude modulator 300 in the array-reader preamplifier 326. In some embodiments, the quadrature amplitude modulator 300 combines the two channels into one channel by quadrature amplitude modulation of a carrier signal by the two channels. In some embodiments, a sinusoidal carrier signal is amplitude modulated by the signal from one reader, a 90 degree phase-shifted version of the carrier signal is amplitude modulated by the signal from the other reader, and the modulated output is combined in a quadrature amplitude modulated signal 340. In some embodiments, the carrier signal is also combined in the quadrature amplitude modulated signal, providing the demodulator with carrier phase information.

The analog signal 340 is processed in an analog front end circuit 344, an analog circuit with a bandwidth of at least 2B Hz. The analog front end circuit 344 performs functions such as, but not limited to, amplification, biasing, and filtering of the analog signal 340, yielding processed analog signal 346. The analog front end circuit 344 may be any circuit known in the art for processing an analog signal prior to sampling and further processing such as equalization and value detection. Based upon the disclosure provided herein, one of ordinary skill in the art will recognize a variety of analog front end circuits that may be used in relation to different embodiments of the present invention.

The processed analog signal 346 is provided to an analog quadrature amplitude demodulator 370 which operates to separate the signal for processed analog signal 346 into two individual analog signals 372, 374, each with a bandwidth of B Hz, each corresponding with one of the analog inputs 304, 306. The two analog signals 372, 374 are each provided to an analog to digital converter (ADC) 382, 384 which sample the two analog signals 372, 374 to yield two streams of digital data samples 391, 392. The analog to digital converters 382, 384 each have a bandwidth of at least about B Hz with a sampling rate of 2B samples/sec. Analog to digital converters 382, 384 may be any circuits known in the art that are capable of producing digital samples corresponding to an analog input signal. Based upon the disclosure provided herein, one of ordinary skill in the art will recognize a variety of analog to digital converter circuits that may be used in relation to different embodiments of the present invention. The analog front end 344 in read channel 398 is thus a high bandwidth circuit adapted to process the 2-channel analog signal 340, while the analog to digital converters 382, 384 are lower bandwidth circuits.

The two streams of digital data samples 391, 392 are provided to a joint equalizer 396, which equalizes or filters the two streams of digital data samples 391, 392. In some embodiments, the joint equalizer 396 applies digital finite impulse response filtering to the two streams of digital data samples 391, 392 to recover equalized data samples 397 for the data track. The joint equalizer 396 thus increases the signal to noise ratio for the data track based on the information in the multiple channels from the array-reader. The equalized data samples 397 may be subsequently processed in any suitable manner, such as in a Viterbi algorithm or maximum a posteriori detector to identify the values in the equalized data samples 397. In some embodiments, the joint equalizer 396 output consists of two streams of digital samples to facilitate detection of data bits from two tracks on the storage medium.

Figure 4A:
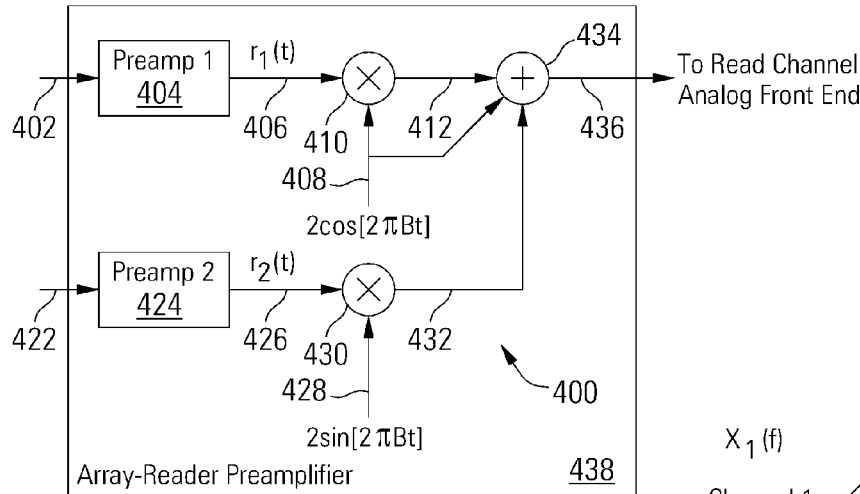
FIG. 4A depicts a preamplifier with quadrature amplitude modulation in accordance with some embodiments of the present invention.

Turning to FIG. 4A, a quadrature amplitude modulator 400 is depicted, integrated in an array-reader preamplifier 438 with two channel preamplifiers 404, 424, in accordance with some embodiments of the present invention. The quadrature amplitude modulator 400 can be used in place of the quadrature amplitude modulator 200 of FIG. 2 in some embodiments.

Two analog inputs 402, 422 from an array-reader are provided to preamplifiers 404, 424 in an array-reader preamplifier 438, yielding amplified analog signals 406, 426. In some embodiments, each of the preamplifiers 404, 424 are adapted to the characteristics of its associated analog input 402, 422 and the reader in the array-reader from which the analog input is obtained. Each of the two channels has a bandwidth of B Hz each, and each of the preamplifiers 404, 424 has a bandwidth of at least B Hz. The preamplifiers 404, 424 may be any circuit known in the art or that may be developed in the future that is capable of amplifying analog signals. Based upon the disclosure provided herein, one of ordinary skill in the art will recognize a variety of amplifier circuits that may be used in relation to different embodiments of the present invention.

Amplified analog signals 406, 426 from preamplifiers 404, 424 are provided to the quadrature amplitude modulator 400 in the array-reader preamplifier 438. Each amplified analog signals 406, 426 are used to amplitude modulate a carrier signal 408, 428. Carrier signal 408, represented in some embodiments as 2 cos [2πBt], and carrier signal 428, or 2 sin [2πBt], are analog carrier signals of the same frequency B but with a 90 degree phase difference. Amplified analog signal 406 is multiplied by carrier signal 408 in multiplier 410, yielding a modulated signal or modulated channel one 412. Amplified analog signal 426 is multiplied by carrier signal 428 in multiplier 430, yielding modulated channel two 432. Carrier signals 408, 428 can be generated in any suitable manner, such as, but not limited to, a frequency synthesizer, and the multipliers 410, 430 can be any suitable circuits known in the art that are capable of multiplying time-varying analog signals. Based upon the disclosure provided herein, one of ordinary skill in the art will recognize a variety of signal generator and multiplier circuits that may be used in relation to different embodiments of the present invention.

The modulated channels 412, 432 are combined with each other and with the carrier signal 408 in a summer 434 to yield a combined analog signal 436. Again, the carrier signal 408 is added to the combined analog signal 436 to provide phase information about the carrier to facilitate coherent demodulation at the receiver. The amplitude of the carrier signal 408 is set at a point that yields the desired performance balance for the particular system, with a smaller amplitude not degrading as much the signal to noise ratio in the analog front end circuit and a larger amplitude reducing the latency of extracting a coherent carrier signal in the receiver. The bandwidth of combined analog signal 436 is about 2B Hz, where B is the bandwidth of a single channel. The summer 434 can be any circuit known in the art that is capable of combining analog signals to produce a single analog output containing information from all the inputs. Based upon the disclosure provided herein, one of ordinary skill in the art will recognize a variety of summer circuits that may be used in relation to different embodiments of the present invention.

The combined analog signal 436 can be transmitted to any suitable receiver, such as, but not limited to, an analog front end in a read channel, using any suitable conductor or transmission medium, such as, but not limited to, flex cables or flexible printed circuits.

In some embodiments in which multiple analog signals are combined into one analog front end, the combined analog signal may be need to be attenuated. Given that multiple analog signals are being combined into one analog front end with a fixed allowable signal range, the total signal energy of multiple analog signals might exceed the allowable signal range of the analog front end. Accordingly, in some embodiments, the combined signal is attenuated before applying the combined signal to the analog front end, or attenuated within early stages of the analog front end, as long as the combined signal still stays within the limits of allowable signal range before it is attenuated. Attenuating the signal, however, tends to degrade signal to noise range (SNR) due to the relative contribution of noise present downstream in the signal path after attenuation; therefore the amount of attenuation should be set to the minimum required value. Moreover, attenuation should be placed as late as possible in the signal path. Based upon the disclosure provided herein, one of ordinary skill in the art will recognize a variety of attenuation techniques that may be used in relation to different embodiments of the present invention.

The operation of the quadrature amplitude modulator 400 is described in the following equations, in which a capitalized symbol for a signal denotes the Fourier transform of the signal represented by a lower case symbol, that is, $R_k(f)$ is the Fourier transform of $r_k(t)$. The signal combining performed by some embodiments of the quadrature amplitude modulator 400 can be described as:

$$Z(f)=R_1(f+B)+R_1(f-B)+jR_2(f+B)-jR_2(f-B)+\delta(f+B)-\delta(f-B) \quad (Eq\ 1)$$

where $Z(f)$ is the Fourier transform of combined analog signal 436, B is the bandwidth of a single channel, or 1/T where T is the baud rate for a single channel, $R_1(f+B)$ and $R_1(f-B)$ are the Fourier transforms of amplified analog signal 406 $r_1(t)$, shifted down and up by B Hz, $R_2(f+B)$ and $R_2(f-B)$ are the Fourier transforms of amplified analog signal 426 $r_2(t)$, shifted down and up by B Hz, and $\delta(f+B)$ and $\delta(f-B)$ are the Fourier transforms of the carrier signal.

Figure 4B:
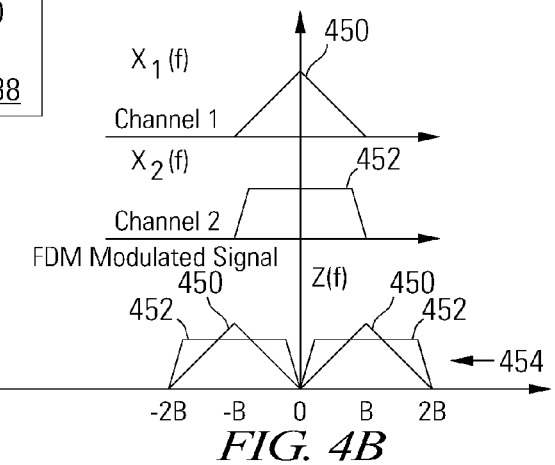
FIG. 4B depicts a frequency domain chart of multiple reader channels multiplexed by the quadrature amplitude modulation in accordance with some embodiments of the present invention.

Turning to FIG. 4B, a frequency domain spectrum chart shows the two array-reader channels combined by an embodiment of the quadrature amplitude modulator 400 of FIG. 4A. The Fourier transforms of the amplified analog signals 406, 426 for two channels $X_1(f)$ 450 and $X_2(f)$ 452 are depicted prior to quadrature amplitude modulation. (The shapes of the envelopes 450 and 452 are selected only for clarity in distinguishing them in FIG. 4B and are not indicative of the content or frequency response.) Each of the two channels $X_1(f)$ 450 and $X_2(f)$ 452 are centered at a center frequency zero prior to modulation. The Fourier transform $Z(f)$ 454 of the combined analog signal 454 combines both channels, frequency shifted and duplicated as shown in FIG. 4B. The quadrature amplitude modulation combines the two amplified analog signals 406, 426 into a single combined analog signal 436 with bandwidth from −2B to 2B that can be transmitted on a single flex cable. (Depending on the manner of transmission, the "single flex cable" can contain a single conductor or, in some embodiments, multiple conductors, such as in a differential signal.) The quadrature amplitude modulated analog signal 436 has overlapping bands, with the components differentiated by their different phase. This phase information used to separate the components is provided to the receiver by including the carrier signal 408 in the combined analog signal 436.

Turning to FIG. 5, a read channel 500 with quadrature amplitude demodulator 516 is depicted in accordance with some embodiments of the present invention. The read channel 500 receives and processes quadrature amplitude modulated analog signal 502 z(t), which can be represented as:

$$z(t)=A_1 r_1(t)\cos(\omega_0 t+\theta_0)+A_2 r_2(t)\sin(\omega_0 t+\theta_0)+A_0 \cos(\omega_0 t+\theta_0) \quad (Eq\ 2)$$

where $r_1(t)$ and $r_2(t)$ are the signals to be modulated from the array-reader, $A_1$ and $A_2$ are amplitude factors for the signals to be modulated, $\cos(\omega_0 t+\theta_0)$ and $\sin(\omega_0 t+\theta_0)$ are the carrier signals at the same frequency with a 90 degree phase offset, and $A_0 \cos(\omega_0 t+\theta_0)$ is the carrier signal component added to the quadrature amplitude modulated analog signal 502 z(t), where $A_0$ is the amplitude factor for the carrier signal and $\theta_0$ is the phase of the carrier signal. Amplitude factors $A_0$, $A_1$ and $A_2$ are gain changes in the signal as it is transmitted and are not known a priori. The relationship between the frequency $\omega_0$, channel bandwidth B and baudrate T is as follows:

$$\omega_0 = 2\pi B = \frac{\pi}{T} \quad (Eq\ 3)$$

$$B = \frac{0.5}{T} \quad (Eq\ 4)$$

A quadrature amplitude modulated analog signal 502 z(t) is processed by analog front end circuit 504, an analog circuit with a bandwidth of at least 2B Hz. The analog front end circuit 504 performs functions such as, but not limited to, amplification, biasing, and filtering of the quadrature amplitude modulated analog signal 502, yielding processed analog signal 506. In some embodiments, the analog front end circuit 504 also performs analog equalization of quadrature amplitude modulated analog signal 502 z(t), equalizing or filtering the signal 502 in the analog domain to compensate for limited bandwidth in the signal path between the preamplifier (e.g., FIG. 1, 104) and the read channel (e.g., FIG. 1, 102, FIG. 5, 500). The analog equalizer in the analog front end circuit 504 can be any suitable equalizer that improves data detection of the resulting signal, based on the effect of limited bandwidth on quadrature amplitude modulated analog signal 502 z(t). In some embodiments, the analog equalizer is a linear equalizer, with filter tap coefficients configured based on the expected signal and the bandwidth of the signal. In some embodiments, the analog equalizer is implemented as a system of real and/or complex poles and/or zeros such that certain frequencies are emphasized while other frequencies are de-emphasized to make use of the dynamic range of the analog-to-digital converter. In some embodiments, the analog equalizer is an adaptive decision feedback equalizer, adapting the filter tap coefficients based on detected data (e.g., 528). The analog front end circuit 504 may be any circuit known in the art for processing an analog signal prior to sampling. Based upon the disclosure provided herein, one of ordinary skill in the art will recognize a variety of analog front end circuits that may be used in relation to different embodiments of the present invention.

The processed analog signal 506 is provided to an analog to digital converter 508 which samples the processed analog signal 506 to yield a stream of digital data samples 510 z[m]. The analog to digital converter 508 has a bandwidth of at least about 2B Hz with a sampling rate at least twice that required for one channel. For example, in some embodiments, the sampling rate for a single channel would be 2B samples/sec, and the analog to digital converter 508 has a sampling rate of 4B samples/sec. Analog to digital converter 508 can be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. The digital data samples 510 z[m] can be represented as:

$$z[m] = z[mTs] = z(mT/2), \quad \text{(Eq 5)}$$

$$\omega_0 mT_s =$$
$$m\pi/2 = A_1 r_1[m]\cos(m\pi/2 + \theta_0) + A_2 r_2[m]\sin(m\pi/2 + \theta_0) +$$
$$A_0 \cos(m\pi/2 + \theta_0) \text{ where } T_s = T/2.$$

Alternative methods of timing and/or carrier recovery do not require the insertion of an actual carrier signal into the signal transferred to the analog front end. For example, applying the analog signal to a circuit block with sufficient nonlinearity, and then subsequently filtering (e.g., bandpass filtering) the signal output of the nonlinear block will yield a signal with carrier component from which a timing clock can be derived via known techniques. Signal gain might be required for the signal at the output of the filter to increase signal amplitude as required. Similarly, phase adjustments might also be required with the appropriate circuitry. Alternatively, the above functions (nonlinearity, filtering, gain, carrier/timing recovery, phase adjust) can also be accomplished in the digital domain (after the analog to digital converter)—with the proviso that the analog to digital converter is appropriately clocked. These techniques may also be applied in some embodiments in the digital domain, after the analog to digital converter. Based upon the disclosure provided herein, one of ordinary skill in the art will recognize a variety of techniques for timing and/or carrier recovery that may be used in relation to different embodiments of the present invention.

In some embodiments, the analog to digital converter 508 is not synchronized to the quadrature amplitude modulated analog signal 502, and the phase $\theta_0$ of the carrier signal may not be known at the receiver. The digital data samples 510 z[m] are therefore processed by a carrier synchronizer 512, which extracts the carrier signal and its phase from digital data samples 510 z[m], and which phase shifts the digital data samples 510 z[m] to synchronize them to the carrier, yielding synchronized digital data samples 514 p[m]. The carrier synchronizer 512 extracts the embedded carrier in the received signal by averaging the received signal over blocks of four samples since the carrier signal $\cos(m\pi/2+\theta_0)$ in the sampled signal z[m] 510 is periodic with period 4 samples. Phase shifting the modulated channel portion of the received signal by the estimated carrier phase makes it suitable for coherent demodulation by a locally generated carrier reference. In some embodiments in which the carrier signal is not inserted into the quadrature amplitude modulated analog signal 502, the carrier synchronizer 512 or other circuit element is operable to perform timing and/or carrier recovery as disclosed above.

The two channels in synchronized digital data samples 514 p[m] are separated by quadrature amplitude demodulator 516, yielding two individual data channels 518 $x_1$[n], 520 $x_2$[n], each containing digital samples corresponding with one of the array-reader outputs. Quadrature amplitude demodulation involves down-sampling the odd and even streams of phase-compensated received signal by the respective carrier at the baseband. Notably, the term "quadrature amplitude demodulator" is sometimes used herein to refer to a circuit or device that incorporates the functions of both the carrier synchronizer 512 and demodulator 516. The two data channels 518 $x_1$[n], 520 $x_2$[n] are provided to a joint equalizer 522, which equalizes or filters the two data channels 518 $x_1$[n], 520 x[n]. In some embodiments, the joint equalizer 522 applies digital finite impulse response filtering to the two data channels 518 $x_1$[n], 520 $x_2$[n] to yield equalized data samples 524 y[n] for the data track based on the two data channels 518 $x_1$[n], 520 $x_2$[n]. The joint equalizer 522 thus increases the signal to noise ratio for the data track based on the information in the multiple channels from the array-reader. Based upon the disclosure provided herein, one of ordinary skill in the art will recognize a variety of equalizer circuits that may be used in relation to different embodiments of the present invention. The equalized data samples 524 y[n] may be subsequently processed in any suitable manner, such as in a Viterbi algorithm detector or a maximum a posteriori detector to generate bit decisions for the equalized data samples 524 y[n]. In some embodiments, the joint equalizer 522 output consists of two streams of digital samples to facilitate detection of data bits from two tracks on the storage medium.

In some embodiments, equalized data samples 524 y[n] are provided to data detector circuit 526 which produces a detected output 528 by applying a data detection algorithm to the data input. In some embodiments, the data detection algorithm can be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention.

Detected output 528 is provided to a central queue memory circuit 530 that operates to buffer data passed between data detector circuit 526 and data decoder circuit 534. When data decoder circuit 534 is available, data decoder circuit 534 receives detected output 528 from central queue memory 530 as a decoder input 532. Data decoder circuit 534 applies a data decoding algorithm to decoder input 532 in an attempt to recover originally written data. The result of the data decoding algorithm is provided as a decoded output 538. Data decoder circuit 534 can be any data decoder circuit known in the art that is capable of applying a decoding algorithm to a received input. Data decoder circuit 534 can be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 534 provides the result of the data decoding algorithm as a decoded output 542. Decoded output 542 is provided to a hard decision output circuit 544 where the data is reordered before providing a series of ordered data sets as a data output 546.

One or more iterations through the combination of data detector circuit 526 and data decoder circuit 534 can be made in an effort to converge on the originally written data set. Processing through both the data detector circuit 526 and data decoder circuit 534 is referred to as a "global iteration". For the first global iteration, data detector circuit 526 applies the data detection algorithm without guidance from a decoded output. For subsequent global iterations, data detector circuit 526 applies the data detection algorithm to equalized data samples 524 y[n] as guided by decoded output 538. Decoded output 538 is received from central queue memory 530 as a detector input 540.

During each global iteration it is possible for data decoder circuit 534 to make one or more local iterations including application of the data decoding algorithm to decoder input 532. For the first local iteration, data decoder circuit 534 applies the data decoder algorithm without guidance from a decoded output 536. For subsequent local iterations, data decoder circuit 534 applies the data decoding algorithm to decoder input 532 as guided by a previous decoded output 536.

Turning to FIG. 6, a carrier synchronizer 600 is depicted which can be used in place of carrier synchronizer 512 in accordance with some embodiments of the present invention. Digital data samples 602 z[m] are stored in buffer 604, from which delayed digital data samples 606 z[m−d] are later retrieved. Digital data samples 602 z[m] are also processed by carrier extractor 608, extracting the carrier signal and yielding the estimated carrier signal 610 c[m]. In some embodiments, carrier extractor 608 calculates the carrier signal, a repeating signal with four samples per period for the array-reader with two readers, by averaging the samples for each of the four sample phases over the block of modulated data, such as a data sector. The carrier extractor 608 can be any circuit known in the art that is capable of extracting a carrier signal from a quadrature amplitude modulated signal that contains the carrier signal. Based upon the disclosure provided herein, one of ordinary skill in the art will recognize a variety of carrier extraction circuits that may be used in relation to different embodiments of the present invention. In some embodiments, the carrier signal frequency is known in advance by carrier extractor 608. The estimated carrier signal 610 c[m] is an estimate of $A_0 \cos(m\lambda/2+\theta_0)$ and can be calculated as:

$$c[m] = \frac{1}{K}\sum_{i=1}^{K} z[m + i4] \quad \text{(Eq 6)}$$

where K is the number of cycles of 4 samples in the transmitted data block or sector, and where c[m] repeats every four samples. Thus, c[m]=c[m+4]=c[m+8], etc.

Subtraction circuit 612 subtracts the carrier signal 610 c[m] from the delayed digital data samples 606 z[m−d], which are delayed in buffer 604 based on the delay in carrier extractor 608, yielding quadrature amplitude modulated signal 614 q[m] without the carrier component. The quadrature amplitude modulated signal 614 q[m] corresponds to the combination of modulated channel one 412 and modulated channel two 432, although possibly with some phase offset since the analog to digital converter 508 does not sample synchronously with the carrier signal. Subtraction circuit 612 calculates quadrature amplitude modulated signal 614 q[m] in some embodiments as:

$$q[m]=z[m-d]-c[m] \quad \text{(Eq 7)}$$

A phase estimator 616 determines the phase offset 618 $\tau_0$ that occurs in the carrier component in the digital data samples 510 z[m] during transmission between the output of the preamplifier (e.g., 438) and the output of the analog to digital converter 508, which causes the digital data samples 510 z[m] to be out of phase with the original combined analog signal 436 when sampled. The phase estimator 616 can be any circuit known in the art that is capable of determining a phase offset in digital samples based on an extracted carrier signal. Based upon the disclosure provided herein, one of ordinary skill in the art will recognize a variety of phase estimator circuits that may be used in relation to different embodiments of the present invention. In some embodiments, phase estimator 616 estimates the delay incurred by the carrier during transmission according to Equation 9 below, which is derived from Equation 8:

$$c[m] = A_0 \cos(m\pi/2 + \theta_0) \quad \text{(Eq 8)}$$
$$= (-1)^{m/2} A_0 \cos(\theta_0) \text{ for } m = \text{even}$$
$$= (-1)^{(m+1)/2} A_0 \sin(\theta_0) \text{ for } m = \text{odd}$$

$$\tau_0 = \frac{1}{\omega_0} \tan^{-1}\left(\frac{\sum (-1)^n c[2n-1]}{\sum (-1)^n c[2n]}\right) \quad \text{(Eq 9)}$$

A phase shifter 620 applies a phase offset to quadrature amplitude modulated signal 614 q[m] to cancel the phase offset 618 $\tau_0$, yielding synchronized digital data samples 622 p[m]. The phase shifter 620 can be any circuit known in the art that is capable of shifting the phase of a digital signal that comprises samples from an analog signal. Based upon the disclosure provided herein, one of ordinary skill in the art will recognize a variety of phase shifter circuits that may be used in relation to different embodiments of the present invention. The resulting synchronized digital data samples 622 p[m] correspond to the original combined modulated channel one 412 and modulated channel two 432, with no carrier signal and no phase change. In some embodiments, phase shifter 620 synchronizes the received signal to the local carrier, removing the phase change of transmission, according to the following:

$$p[m] = q[m - \tau_0] \quad \text{(Eq 10)}$$

$$= A_1 r_1[m]\cos\left(\frac{m\pi}{2}\right) + A_2 r_2[m]\sin\left(\frac{m\pi}{2}\right)$$

where $\cos(m\pi/2)=\{1,0,-1,0,1,0,-1,0,\ldots\}$ and $\sin(m\pi/2)=\{0,1,0,-1,0,1,0,-1,\ldots\}$.

Turning to FIG. 7, a quadrature amplitude demodulator is depicted that can be used in place of quadrature amplitude demodulator 516 in accordance with some embodiments of the present invention. The synchronized digital data samples 702 p[m] are multiplied by digital forms 704, 718 of the phase compensated carrier signal, frequency shifting the channels. One digital carrier signal 704 corresponds to carrier signal 408 in the quadrature amplitude modulator 400 and can be represented in some embodiments as cos [mπ/2]. The other digital carrier signal 718 is at the same frequency with a 90 degree phase offset, corresponds to carrier signal 428, and can be represented in some embodiments as sin [mπ/2]. This produces demodulated signals $v_1[m]$ 708, $v_2[m]$ 722 representing channels one and two from the array-reader, but with bandwidth 2B Hz at 4B samples per second. The demodulated signals $v_1[m]$ 708 and $v_2[m]$ 722 are given by:

$$v_1[m]=2p[m]2\cos(m\pi/2)=A_1r_1[m]*(1+\cos(m\pi)) \quad \text{(Eq 11)}$$

$$v_2[m]=2p[m]2\sin(m\pi/2)=A_2r_2[m]*(1+\cos(m\pi)) \quad \text{(Eq 12)}$$

Low pass filters 710, 724 are low pass filters of bandwidth B Hz which filter the demodulated signals $v_1[m]$ 708 and $v_2[m]$ 722 to reject the frequency components beyond the band [−B, +B]. The low-pass filtered signals 712 $p_1[m]$ and 726 $p_2[m]$ are still with 4B samples per second but bandwidth B Hz. Low pass filters 710, 724 can be any circuit known in the art that are capable of low pass filtering digital signals. Based upon the disclosure provided herein, one of ordinary skill in the art will recognize a variety of low pass filters that may be used in relation to different embodiments of the present invention. The filtered signals 712 $p_1[m]$ and 726 $p_2[m]$ can be represented as follows:

$$p_1[m]=LPF\{v_1[m]\}=A_1r_1[m] \quad \text{(Eq 13)}$$

$$p_2[m]=LPF\{v_2[m]\}=A_2r_2[m] \quad \text{(Eq 14)}$$

The filtered signals 712 $p_1[m]$ and 726 $p_2[m]$ are down-sampled in down-samplers 714, 728, which decimate or down-sample the filtered signals 712 $p_1[m]$ and 726 $p_2[m]$, yielding band-limited digital signals 716 $x_1[n]$, 730 $x_2[n]$, each containing digital samples at a rate of 2B samples per second and each corresponding with one of the array-reader outputs. The down-samplers 714, 728 can be any circuit known in the art that is capable of sampling a signal or otherwise reducing the data rate of a digital signal, for example by discarding every other sample. Based upon the disclosure provided herein, one of ordinary skill in the art will recognize a variety of down-sampling circuits that may be used in relation to different embodiments of the present invention. In some embodiments, the down-sampling of filtered signals 712 $p_1[m]$ and 726 $p_2[m]$ in down-samplers 714, 728 can be represented as follows:

$$x_1[n]=p_1[2n]=A_1r_1[2n] \quad \text{(Eq 15)}$$

$$x_2[n]=p_2[2n]=A_2r_2[2n] \quad \text{(Eq 16)}$$

In some embodiments, the read channel includes an analog quadrature amplitude demodulator as in FIG. 3. In these embodiments, the analog to digital conversion is performed after demodulation as shown in FIG. 3. The analog quadrature amplitude demodulation is performed in any suitable manner, such as, but not limited to, in the same manner as disclosed in FIGS. 6-7 and Equations 2-14, although in the analog domain, and without the need for down-samplers 714 and 728.

Figure 8:
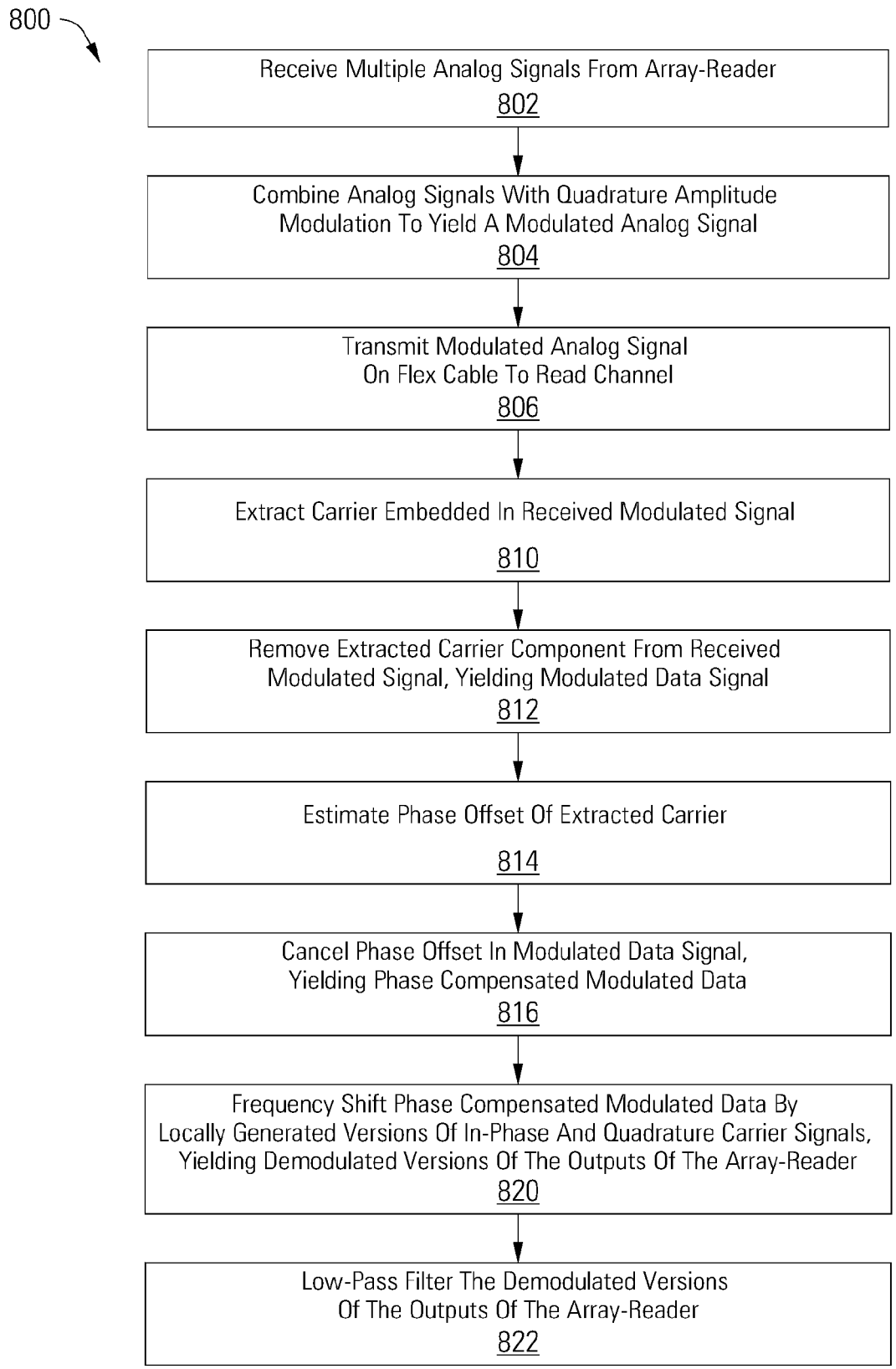
FIG. 8 depicts a flow diagram of an operation to transmit data from an array-reader in a magnetic recording system in accordance with some embodiments of the present invention.

Turning to FIG. 8, a flow diagram 800 depicts an operation to transmit data from an array-reader in a magnetic recording system in accordance with some embodiments of the present invention. Following flow diagram 800, multiple analog signals are received from an array-reader (block 802). The multiple analog signals and a carrier signal are combined using quadrature amplitude modulation to yield a modulated analog signal (block 804). In some embodiments, two analog signals are combined by modulating each using in-phase and quadrature carriers and adding the result. In some embodiments, the carrier signal that is combined with the multiple analog signals is the in-phase carrier, thereby facilitating coherent demodulation in the receiver. The modulated analog signal is transmitted on flex cables to a read channel (block 806).

The carrier embedded in the received modulated signal is extracted or recovered (block 810). In some digital demodulation embodiments, in which the received modulated signal is sampled before demodulation, this is accomplished by averaging like-phase samples over the transmitted block of data. For example, given four samples per period for the array-reader having 2 readers, the first of the four samples in each period in the transmitted block of data is averaged to yield the averaged first sample, the second of the four samples in each period in the transmitted block of data is averaged to yield the averaged second sample, and so on. The like-phase samples are thus samples captured at repetitive, regular intervals. The extracted carrier component is removed from the received modulated signal, yielding a modulated data signal (block 812). In some digital demodulation embodiments, this is accomplished by subtracting the extracted carrier from the modulated signal samples. The phase of the extracted carrier is estimated to yield a phase offset (block 814). The phase offset is cancelled in the modulated data signal (block 816), yielding phase compensated modulated data. The phase compensated modulated data is frequency shifted by locally generated versions of in-phase and quadrature carrier signals, yielding high bandwidth channel signals representing demodulated versions of the outputs of the array-reader (block 820). The high bandwidth channel signals are low-pass filtered (block 822). In some digital demodulation embodiments, the outputs of the low-pass filters are down-sampled to obtain demodulated versions of the outputs of the array-reader.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for an array-reader based magnetic recording system with quadrature amplitude modulation. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. A magnetic recording system comprising:
   an array of analog inputs operable to receive analog signals retrieved from a magnetic storage medium;
   a quadrature amplitude modulator operable to combine the analog signals to yield a quadrature amplitude modulated signal;
   a quadrature amplitude demodulator operable to yield a plurality of demodulated signals from the quadrature amplitude modulated signal corresponding to each channel of the array; and
   a joint equalizer operable to filter the plurality of demodulated signals to yield an equalized output.

2. The system of claim 1, wherein the quadrature amplitude modulator is operable to include a carrier signal with the analog signals in the quadrature amplitude modulated signal.

3. The system of claim 1, further comprising a carrier synchronizer operable to extract the carrier signal and to synchronize the quadrature amplitude modulated signal to the extracted carrier signal.

4. The system of claim 3, wherein the carrier synchronizer comprises a carrier extractor operable to recover the carrier signal from the quadrature amplitude modulated signal by averaging like-phase samples of the quadrature amplitude modulated signal, a subtractor circuit operable to subtract the carrier signal from the quadrature amplitude modulated signal, a phase estimator operable to estimate a phase offset of the carrier signal, and a phase shifter operable to cancel the phase offset of the carrier signal from the quadrature amplitude modulated signal.

5. The system of claim 1, further comprising a flexible cable operable to transmit the quadrature amplitude modulated signal.

6. The system of claim 1, wherein the quadrature amplitude modulator comprises:
   a first multiplier operable to multiply a first of the analog inputs by an in-phase carrier signal to yield a first modulated signal;
   a second multiplier operable to multiply a second of the analog inputs by a quadrature carrier signal to yield a second modulated signal, wherein the in-phase carrier signal and quadrature carrier signal comprise a same analog signal with a 90 degree phase offset; and
   a summer circuit operable to combine the first modulated signal and second modulated signal to yield the quadrature amplitude modulated signal.

7. The system of claim 6, wherein the summer circuit is further operable to combine the in-phase carrier signal in the quadrature amplitude modulated signal.

8. The system of claim 1, wherein the quadrature amplitude demodulator comprises:
   a first multiplier operable to multiply the quadrature amplitude modulated signal by an in-phase carrier signal to yield a first demodulated signal;
   a first low-pass filter operable to filter the first demodulated signal to yield a first filtered signal;
   a second multiplier operable to multiply the quadrature amplitude modulated signal by a quadrature carrier signal to yield a second demodulated signal, wherein the in-phase carrier signal and quadrature carrier signal comprise a same signal with a 90 degree phase offset; and
   a second low-pass filter operable to filter the second demodulated signal to yield a second filtered signal.

9. The system of claim 8, wherein the quadrature amplitude demodulator comprises a digital demodulator, wherein the in-phase carrier signal and the quadrature carrier signal comprise digital signals, the system further comprising an analog to digital converter operable to sample the quadrature amplitude modulated signal to yield a digital quadrature amplitude modulated signal, and wherein the quadrature amplitude demodulator operates on the digital quadrature amplitude modulated signal.

10. The system of claim 9, wherein the quadrature amplitude demodulator further comprises a first down-sampler operable to down-sample the first filtered signal, and a second down-sampler operable to down-sample the second filtered signal.

11. The system of claim 8, wherein the quadrature amplitude demodulator comprises an analog demodulator, wherein the in-phase carrier signal and the quadrature carrier signal comprise analog signals, the system further comprising a plurality of analog to digital converters operable to sample the first filtered signal and the second filtered signal.

12. The system of claim 1, further comprising a signal attenuator operable to attenuate a signal derived from the analog signals.

13. The system of claim 1, further comprising a carrier synchronizer operable to recover timing information for a carrier signal used to generate the quadrature amplitude modulated signal, wherein the carrier signal is not included in the quadrature amplitude modulated signal by the quadrature amplitude modulator.

14. A method of connecting an array-reader head assembly in a magnetic storage system to a read channel in the magnetic storage system, comprising:
   providing a quadrature amplitude modulator in the array-reader head assembly operable to yield a quadrature amplitude modulated signal containing an array of analog signals from the array-reader head assembly;
   connecting the quadrature amplitude modulator in the array-reader head assembly to the read channel by a flexible cable pair;
   providing a quadrature amplitude demodulator in the read channel operable to yield a plurality of demodulated signals from the quadrature amplitude modulated signal corresponding to each element of the array; and
   providing a joint equalizer in the read channel operable to filter the plurality of demodulated signals to yield an equalized output.

15. The method of claim 14, wherein the quadrature amplitude modulator is operable to modulate the array of analog signals with different phase offset versions of a carrier signal to yield modulated signals, and to combine the modulated signals and one of the versions of the carrier signal in the quadrature amplitude modulated signal.

16. The method of claim 15, further comprising providing a carrier synchronizer operable to recover the carrier signal from the quadrature amplitude modulated signal, to subtract the carrier signal from the quadrature amplitude modulated signal, to estimate a phase offset of the carrier signal, and to cancel the phase offset of the carrier signal from the quadrature amplitude modulated signal.

17. The method of claim 16, wherein the carrier synchronizer is operable to recover the carrier signal by averaging like-phase samples of the quadrature amplitude modulated signal captured at regular intervals.

18. The method of claim 14, further comprising providing an analog to digital converter operable to sample the quadrature amplitude modulated signal to yield a sampled quadrature amplitude modulated signal, wherein the quadrature amplitude demodulator is operable to demodulate a signal derived from the sampled quadrature amplitude modulated signal.

19. The method of claim 14, wherein the quadrature amplitude demodulator comprises a digital demodulator, further operable to low-pass filter and down-sample the plurality of demodulated signals.

20. A storage system comprising:
a storage medium;
an array-reader head assembly disposed in relation to the storage medium and operable to provide an array of analog signals corresponding to information on the storage medium;
a preamplifier operable to amplify the array of analog signals;
a quadrature amplitude modulator operable to combine the analog signals to yield a quadrature amplitude modulated signal; and
a flexible cable operable to carry the quadrature amplitude modulated signal from the array-reader head assembly to a read channel circuit, the read channel circuit comprising:
an analog front end circuit operable to perform analog equalization of the quadrature amplitude modulated signal to reduce effects of limited bandwidth;
a quadrature amplitude demodulator operable to yield a plurality of demodulated signals from the quadrature amplitude modulated signal corresponding to each channel of the array; and
a joint equalizer operable to filter the plurality of demodulated signals to yield an equalized output.

* * * * *